(12) United States Patent
Lin et al.

(10) Patent No.: US 7,757,031 B2
(45) Date of Patent: *Jul. 13, 2010

(54) DATA TRANSMISSION COORDINATING METHOD AND SYSTEM

(75) Inventors: Ruei-Ling Lin, Taipei (TW); Jiin Lai, Taipei (TW)

(73) Assignee: Via Technologies, Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/876,579

(22) Filed: Oct. 22, 2007

(65) Prior Publication Data

US 2008/0046618 A1 Feb. 21, 2008

Related U.S. Application Data

(63) Continuation-in-part of application No. 11/257,259, filed on Oct. 24, 2005, now abandoned.

(51) Int. Cl.
*G06F 13/36* (2006.01)
*G06F 13/00* (2006.01)
*G06F 7/38* (2006.01)

(52) U.S. Cl. .................. 710/306; 710/300; 710/316; 712/229; 713/300; 713/323

(58) Field of Classification Search .................. 710/307
See application file for complete search history.

(56) References Cited

U.S. PATENT DOCUMENTS

| | | | |
|---|---|---|---|
| 6,003,103 A | 12/1999 | Klein | |
| 6,282,596 B1 | 8/2001 | Bealkowski et al. | |
| 6,286,097 B1 | 9/2001 | Chang | |
| 6,519,670 B1 | 2/2003 | Meiyappan | |
| 6,557,065 B1 * | 4/2003 | Peleg et al. | 710/300 |
| 6,608,528 B2 | 8/2003 | Tam et al. | |
| 6,609,171 B1 | 8/2003 | Singh et al. | |
| 6,681,279 B1 | 1/2004 | Peng | |
| 6,681,286 B2 | 1/2004 | Chang | |
| 6,721,833 B2 | 4/2004 | Lai | |

(Continued)

OTHER PUBLICATIONS

Intel 840 Chipset: 82840 Memory Controller Hub (MCH), available at http://download.intel.com/design/chipsets/datashts/29802002.pdf. Sep. 2000—166 pages.*

(Continued)

*Primary Examiner*—Mark Rinehart
*Assistant Examiner*—Brian T Misiura
(74) *Attorney, Agent, or Firm*—Kirton & McConkie; Evan R. Witt

(57) ABSTRACT

A data transmission coordinating method is used between a central processing unit and a bridge chip of a computer system. By entering the computer system into a coordinating state, the data transmission coordinating method is executed. The bridge chip and the CPU are informed of maximum bit numbers of each other for data transmission therebetween via the front side bus. Then, a commonly operable maximum bit number for data transmission between the CPU and the bridge chip can be coordinated according to the first and second maximum bit numbers. Once the commonly operable maximum bit number is determined, the CPU is reset to operate with the commonly operable maximum bit number. The maximum bit numbers are those of bus transmission width or bus transmission speed.

16 Claims, 18 Drawing Sheets

U.S. PATENT DOCUMENTS

| | | | |
|---|---|---|---|
| 6,963,991 B2 * | 11/2005 | Hill et al. | 713/500 |
| 6,968,418 B2 | 11/2005 | Wollbrink et al. | |
| 6,970,962 B2 | 11/2005 | Dieffenderfer et al. | |
| 7,003,614 B2 | 2/2006 | Addy | |
| 7,024,503 B2 | 4/2006 | Peng | |
| 7,073,082 B2 * | 7/2006 | Hsu | 713/323 |
| 7,096,303 B1 | 8/2006 | Caruk et al. | |
| 7,111,103 B2 * | 9/2006 | Wang et al. | 710/306 |
| 7,120,764 B2 | 10/2006 | Chuang et al. | |
| 7,124,269 B2 | 10/2006 | Chuang et al. | |
| 7,133,960 B1 | 11/2006 | Thompson et al. | |
| 7,281,171 B2 * | 10/2007 | Brown | 714/48 |
| 7,480,587 B2 * | 1/2009 | Cancel | 702/132 |
| 7,480,808 B2 * | 1/2009 | Caruk et al. | 713/300 |
| 2004/0225821 A1 | 11/2004 | Klein et al. | |
| 2005/0093524 A1 | 5/2005 | Hsu | |
| 2006/0095631 A1 | 5/2006 | Lin | |
| 2006/0095633 A1 | 5/2006 | Lin et al. | |
| 2006/0164328 A1 | 7/2006 | Jaff | |
| 2006/0282600 A1 | 12/2006 | Wang | |
| 2008/0263254 A1 * | 10/2008 | Su et al. | 710/310 |

OTHER PUBLICATIONS

Intel 845 Chipset: 82845 Memory Controller Hub (MCH) for DDR, available at http://download.intel.com/design/chipsets/datashts/29860401.pdf. Jan. 2002—148 pages.*

* cited by examiner

DATA TRANSMISSION COORDINATING METHOD AND SYSTEM

CROSS REFERENCE TO RELATED PATENT APPLICATION

This patent application is a continuation-in-part (CIP) application of a U.S. patent application Ser. No. 11/257,259 filed Oct. 24, 2005 and now pending. The contents of the related patent application are incorporated herein for reference.

FIELD OF THE INVENTION

The present invention relates to a data transmission coordinating method, and more particularly to a data transmission coordinating method for coordinating transmission width between a central processing unit and a bridge chip of a computer system.

BACKGROUND OF THE INVENTION

A motherboard of a computer system is generally provided with a central processing unit (CPU), a chipset and some peripheral circuits. The CPU is the core component of a computer system for processing and controlling operations and cooperation of all the other components in the computer system. The chipset may be in various forms but generally includes a north bridge chip and a south bridge chip, which are used to control communication between the CPU and the peripheral circuits. In general, the north bridge chip serves for the communication with the high-speed buses while the south bridge chip serves for the communication with low-speed devices in the system.

FIG. 1A is a schematic functional block diagram illustrating some devices disposed on or coupled to a motherboard 1 in a single CPU computer system. On the motherboard 1, a chipset 2 including a north bridge chip 20 and a south bridge chip 21 is electrically connected to the CPU 10 via a front side bus (FSB) 22. On the motherboard 1, an accelerated graphics port (AGP) interface 31 and a random access memory (RAM) 32 are electrically connected to the north bridge chip 20 via an AGP bus 311 and a memory bus 321, respectively. A peripheral component interconnect (PCI) interface 30 is electrically connected to the south bridge chip 21 via a PCI bus 301. In addition, an industry standard architecture (ISA) interface 40, an integrated device electronics (IDE) interface 41, a universal serial bus (USB) interface, an external keyboard device 43 and an external mouse device 44, which operate at a low speed, are electrically connected to the south bridge chip 21.

In the above architecture, the standard of the FSB 22 should support both the north bridge chip 20 and the CPU 10 coupled thereto, as illustrated in FIG. 1B. If the transmission standard of the north bridge chip 20 via the FSB 22 mismatched that of the CPU 10, e.g. different in width (bits) or bit speed (MHz), the communication between the north bridge chip 20 and the CPU 10 would fail or some of transmitted data might be lost. For example, a bridge chip adapted to a processor with a 64-bit front-side-bus width will be unsuited to another processor with a 32-bit front-side-bus width. Otherwise, a half of the transmitted data will not be received. In other words, the compatibility between the CPU and the bridge chip is critical to data transmission.

Some possible combinations of front-side-bus width of the CPU and the north bridge chip are exemplified with reference to FIGS. 2A~2D. The front side bus (FSB) includes an address bus and a data bus respectively for address and data transmission between the CPU and the north bridge chip. In the example of FIG. 2A, the CPU 101 and the north bridge chip 201 have the same FSB width, e.g. both 32 bits for address transmission and both 64 bits for data transmission. Since the transmission standards of the CPU 101 and the north bridge chip 201 are compatible with each other, the system can operate normally. Likewise, in the example of FIG. 2B, the CPU 102 and the north bridge chip 202 have the same FSB width, e.g. both 13 bits for address transmission and both 32 bits for data transmission. Since the transmission standards of the CPU 102 and the north bridge chip 202 are compatible with each other, the system can also operate normally. In the example of FIG. 2C, on the other hand, while the CPU 102 has 13-bit width for address transmission and 32-bit width for data transmission, the north bridge chip 201 has 32-bit width for address transmission and 64-bit width for data transmission. Since the transmission standards of the CPU 102 and the north bridge chip 201 are not consistent, the communication between the CPU 102 and the north bridge chip 201 cannot be normally performed. A similar idle situation is illustrated in FIG. 2D, where the CPU 101 allowing 32-bit width for address transmission and 64-bit width for data transmission is inconsistent with the north bridge chip 201 allowing 13-bit width for address transmission and 32-bit width for data transmission. In addition to FSB width, incompatible transmission speeds between the CPU and bridge chip will also adversely affect the operation of the computer system.

With increasing tendency to compactness of devices, portable electronic apparatus such as personal digital assistants (PDAs) or notebook computers require smaller motherboards or chips with lower pin numbers compared to a desktop computer that needs to support various applications. Accordingly, CPUs with different transmission standards for optional requirement of performance or compactness and bridge chips with different transmission standards for conforming to the transmission standards of the corresponding CPUs need be manufactured and stocked for selection to avoid the mismatching problems.

SUMMARY OF THE INVENTION

The present invention provides a data transmission coordinating method, which allows a CPU and a bridge chip with mismatching transmission standards to work together well.

The present invention provides a data transmission coordinating method for a central processing unit and a bridge chip of a computer system. In the data transmission coordinating method, information associated with a first transmission standard of the bridge chip is read from a memory unit accessible by the bridge chip, e.g. a storage unit disposed in the bridge chip or a read-only memory unit coupled to the bridge chip. A first signal from the bridge chip is issued to the central processing unit to inform the central processing unit of the first transmission standard of the bridge chip. A second signal is issued from the central processing unit to the bridge chip to inform the bridge chip of a second transmission standard of the central processing unit. A commonly operable transmission standard is coordinated for both the central processing unit and the bridge chip according to the first transmission standard and the second transmission standard.

The present invention also provides a data transmission coordinating method for a central processing unit and a bridge chip of a computer system. The method includes the following steps: entering a coordinating state of the computer system; reading information from a memory unit accessible by the bridge chip to realize a first maximum bit number of the bridge chip for data transmission with the central processing unit via a bus; informing the central processing unit of the first maximum bit number of the bridge chip; informing the bridge chip of a second maximum bit number of the central processing unit for data transmission with the bridge chip via the bus; coordinating a commonly operable maximum bit number for data transmission between the central processing unit and the bridge chip via the bus according to the first and second maximum bit numbers; and resetting the central processing unit to operate with the commonly operable maximum bit number.

The present invention also provides a data transmission coordinating system including a bridge chip, a central processing unit, a bus and a memory unit. The bridge chip is operable under a first transmission standard. The central processing unit is operable under a second transmission standard. The bus communicates the bridge chip and the central processing unit under an operable transmission standard common to the bridge chip and the central processing unit. The memory unit stores the information associated with the first transmission standard. The bridge chip reads the first transmission standard from the memory unit and issues a first signal to inform the central processing unit of the first transmission standard thereof, and the central processing unit issues a second signal to inform the bridge chip of the second transmission standard thereof after a coordinating state is entered, thereby coordinating the operable transmission standard for data transmission between the bridge chip and the central processing unit via the bus according to the first transmission standard and second transmission standard.

The present invention provides a data transmission coordinating method for use between a central processing unit and a bridge chip of a computer system. In the data transmission coordinating method, a first signal is issued from the central processing unit to the bridge chip to inform the bridge chip of a first transmission standard of the central processing unit, and a second signal is issued from the bridge chip to the central processing unit to inform the central processing unit of a second transmission standard of the bridge chip. A commonly operable transmission standard for both the central processing unit and the bridge chip is then coordinated according to the first and second transmission standards.

The present invention also provides a data transmission coordinating method for use between a central processing unit and a bridge chip of a computer system, including steps of: entering a coordinating state of the computer system; informing the bridge chip of a first maximum bit number of the central processing unit for data transmission via a bus between the central processing unit and the bridge chip; informing the central processing unit of a second maximum bit number of the bridge chip for data transmission via the bus between the central processing unit and the bridge chip; coordinating a commonly operable maximum bit number for data transmission between the central processing unit and the bridge chip according to the first and second maximum bit numbers; and resetting the central processing unit to operate with the commonly operable maximum bit number. The first maximum bit number, second maximum bit number and commonly operable bit number for data transmission can be bit numbers of bus transmission width or bit numbers of bus transmission speed per unit of time.

The present invention also provides a data transmission coordinating method for use between a central processing unit and a bridge chip of a computer system, comprising steps of: issuing a first reset signal; issuing a first signal of a first voltage level from the central processing unit to the bridge chip via a first pin communicating the central processing unit with the bridge chip in response to the first resetting signal, the first signal indicating a first transmission standard of the central processing unit; issuing a second signal of a second voltage level from the bridge chip to the central processing unit via a second pin communicating the bridge chip with the central processing unit in response to the first resetting signal, the second signal indicating a second transmission standard of the bridge chip; issuing a second reset signal in response to the first and second signals to reset and operate the central processing unit with a third transmission standard determined according to the first and second transmission standards. The first reset signal may be a peripheral component interconnect (PCI) reset signal, and the second reset signal may be issued by the bridge chip.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

In order to enable the CPU and bridge chip with inconsistent transmission standards to communicate with each other, a data transmission coordinating method according to the present invention is performed in advance to coordinate a commonly operable transmission standard for both the central processing unit and the bridge chip of a computer system. An embodiment of the data transmission coordinating method will be illustrated herein with reference to FIG. 3.

Figure 3:
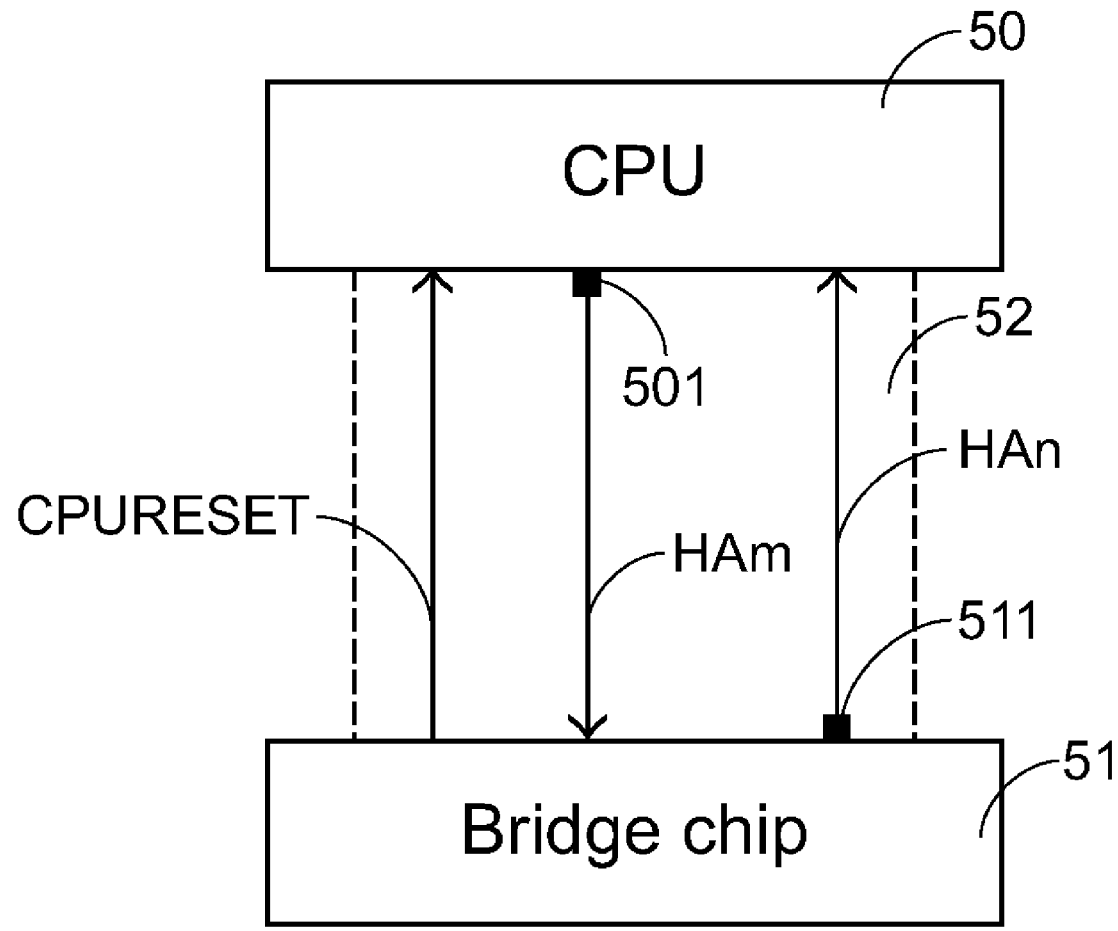
FIG. 3 is a schematic diagram illustrating a data transmission coordinating method according to an embodiment of the present invention, wherein the CPU and the north bridge chip issue respective coordinating signals via selected ones of pins disposed therebetween.

In a computer system of FIG. 3, a CPU 50 communicates with a bridge chip 51, e.g. a north bridge chip, via a bus 52, e.g. a front side bus. For coordinating the commonly operable transmission standard, the CPU 50 issues a coordinating signal HAm from a pin 501 thereof, e.g. the mth bit, which is one of the pins in communication with the bridge chip 51, and the bridge chip 51 issues another coordinating signal HAn from a pin 511 thereof, e.g. the nth bit, which is one of the pins in communication with the CPU 50. Via the coordinating signal HAm, the bridge chip 51 is informed of the transmission standard of the CPU 50, and vice versa. On the other hand, via the coordinating signal HAn, the CPU 50 is informed of the transmission standard of the bridge chip. Since the CPU 50 and the bridge chip 51 realize the transmission standard of each other, a commonly operable transmission standard can be coordinated.

Figure 6:
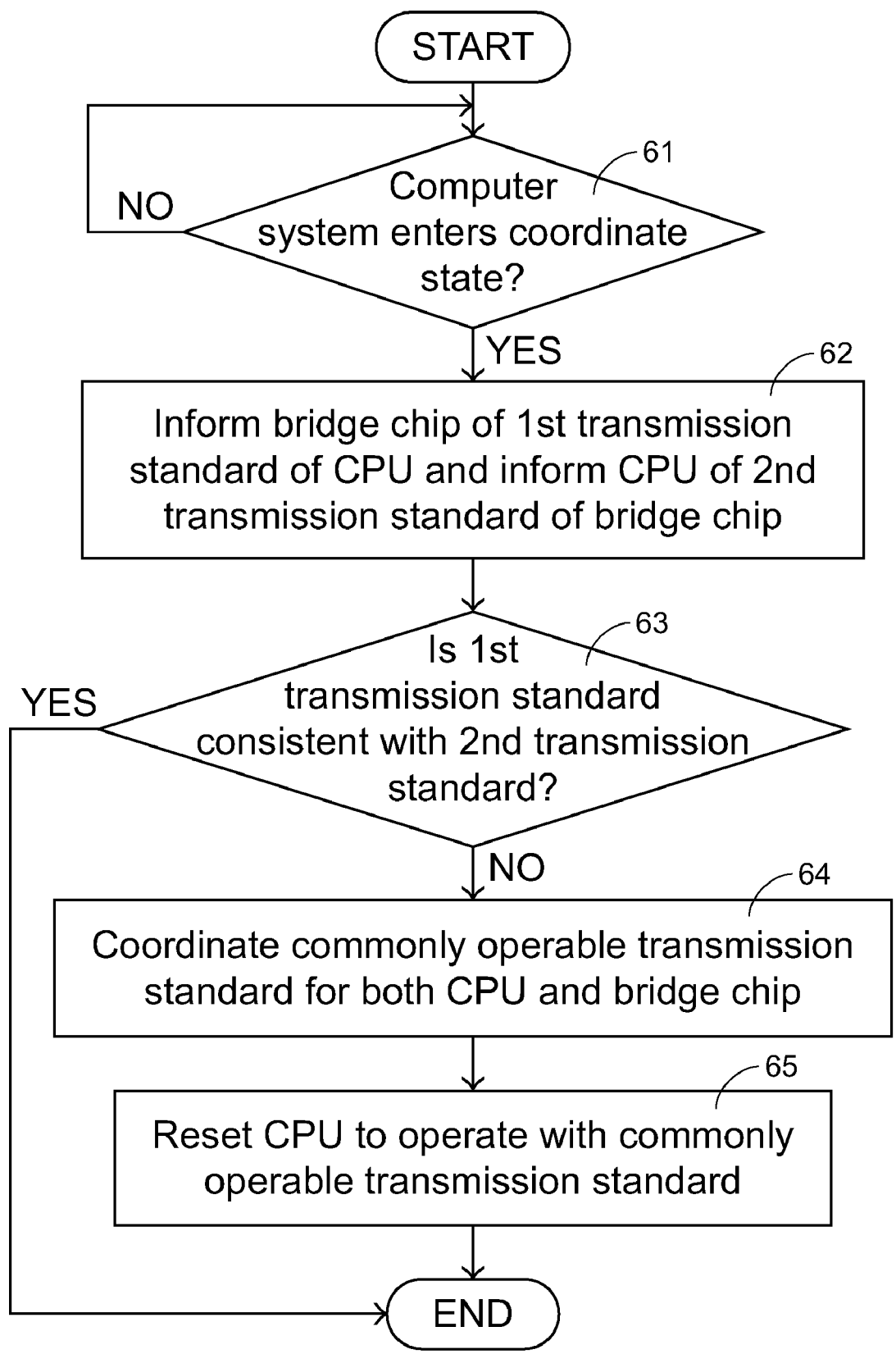
FIG. 6 is a flowchart illustrating a data transmission coordinating method according to an embodiment of the present invention.

A flowchart shown in FIG. 6 illustrates a data transmission coordinating method applicable to the system of FIG. 3. For starting the data transmission coordination, a PCI reset signal is issued (Step 61). Then, the coordinating signals HAm and HAn are issued by the CPU and the bridge chip, respectively (Step 62). If the transmission standards indicated by the coordinating signals HAm and HAn are consistent with each other (Step 63), the subsequent data transmission between the CPU and bridge chip can be performed with current transmission standards. Otherwise, a commonly operable transmission standard for both the CPU and the bridge chip is coordinated (Step 64), and then the bridge chip issues a CPU reset signal to reset the CPU (Step 65). The CPU thus operates with the commonly operable transmission standard for subsequent data transmission.

Figure 2A:
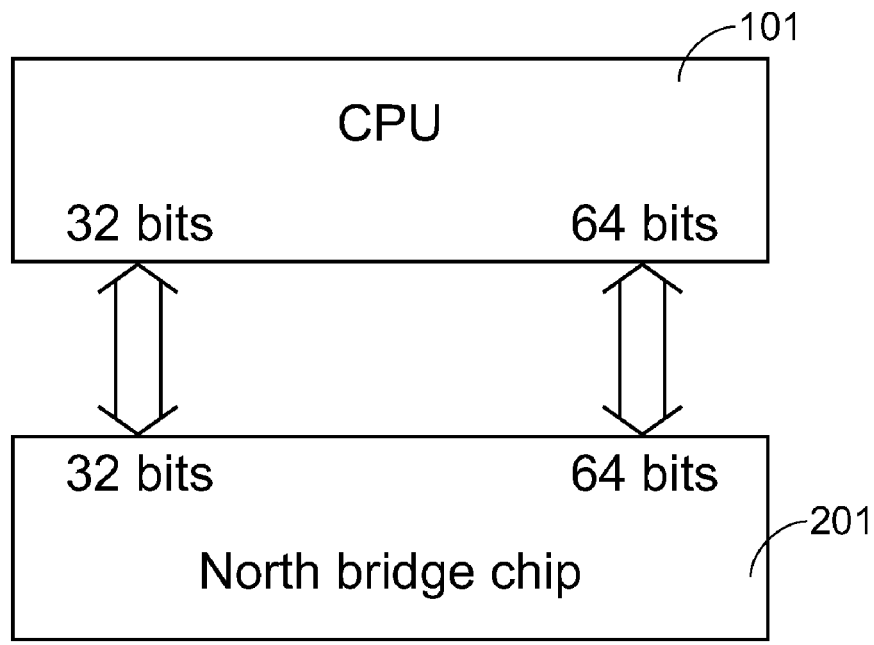
FIGS. 2A~2D are schematic diagrams illustrating four exemplified combinations of bus transmission widths of CPU and north bridge chip.
Figure 2B:
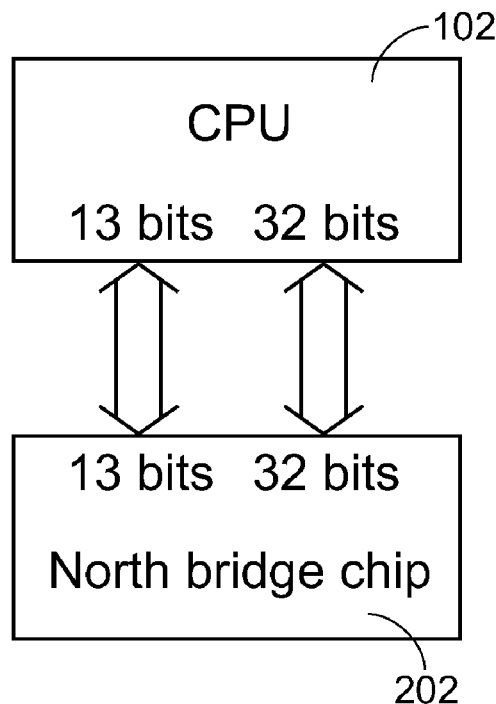
Figure 2C:
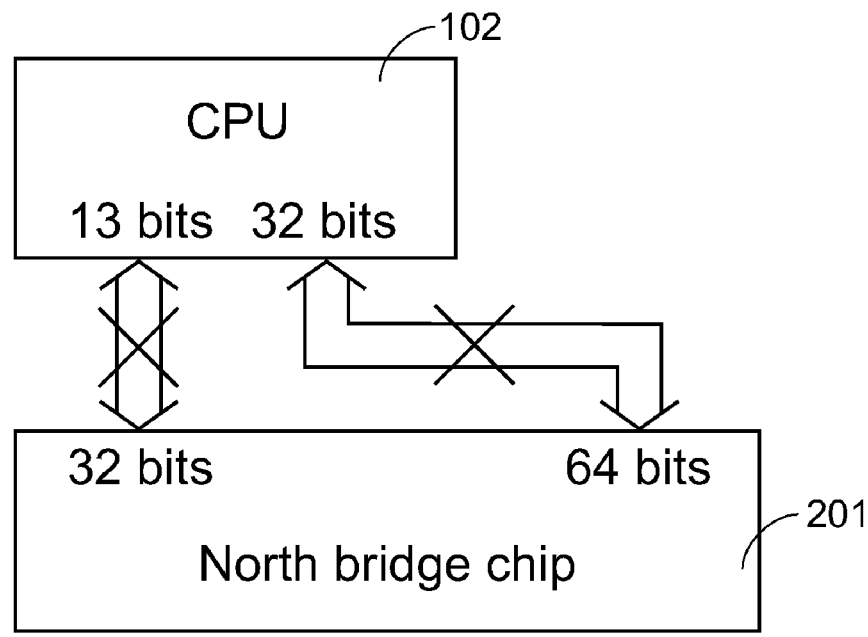
Figure 2D:
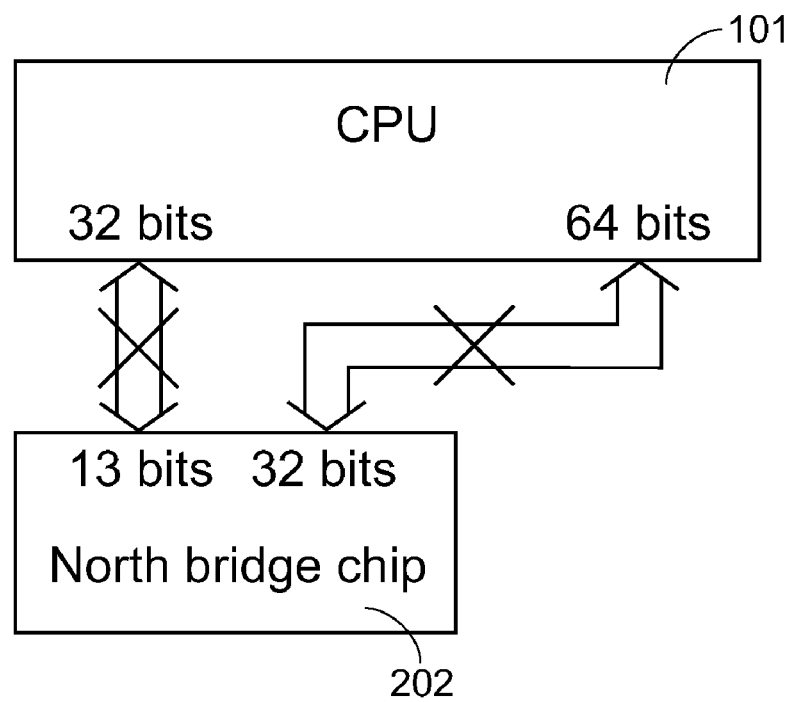
Figure 5A:
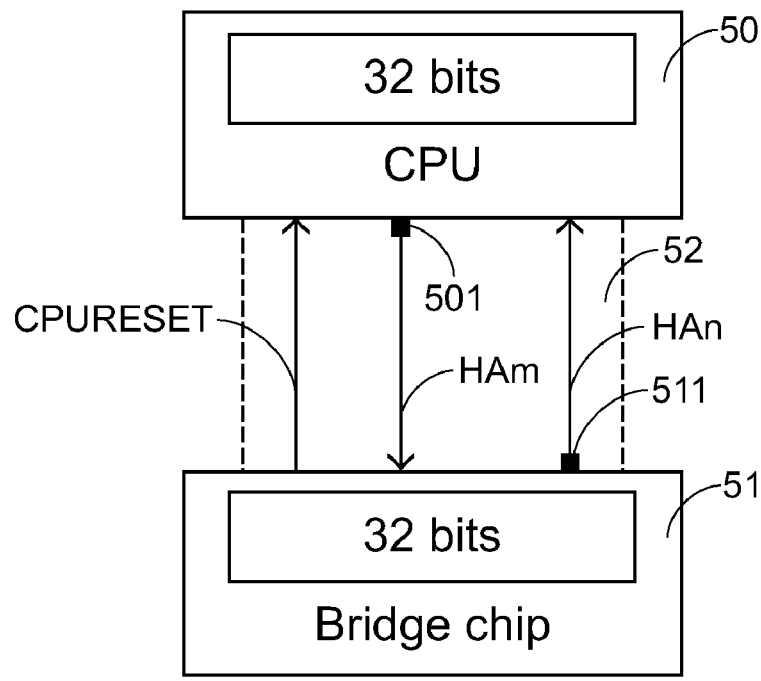
FIGS. 5A~5D are schematic diagrams illustrating the applications of the data transmission coordinating method of FIGS. 3 and 4A~4D to the four exemplified combinations of FIGS. 2A~2D.
Figure 5B:
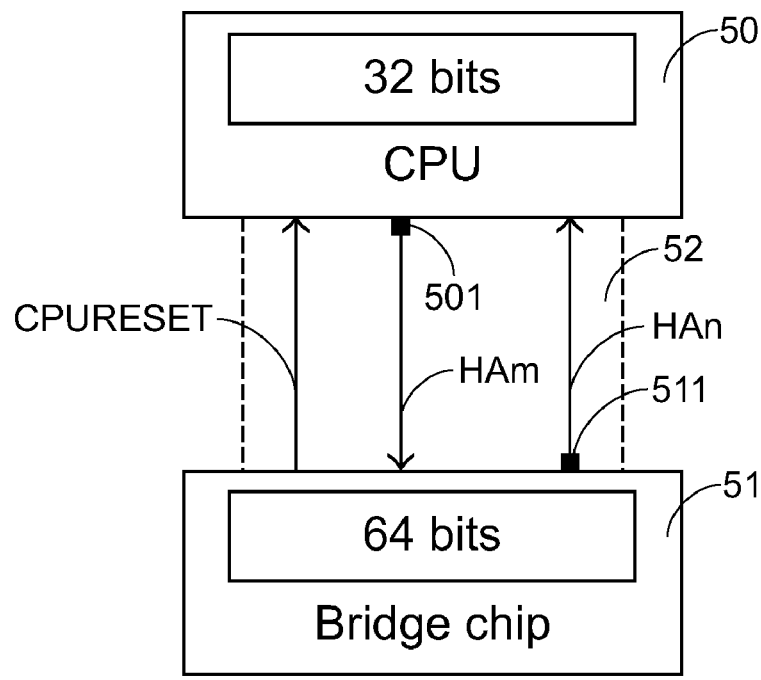
Figure 5C:
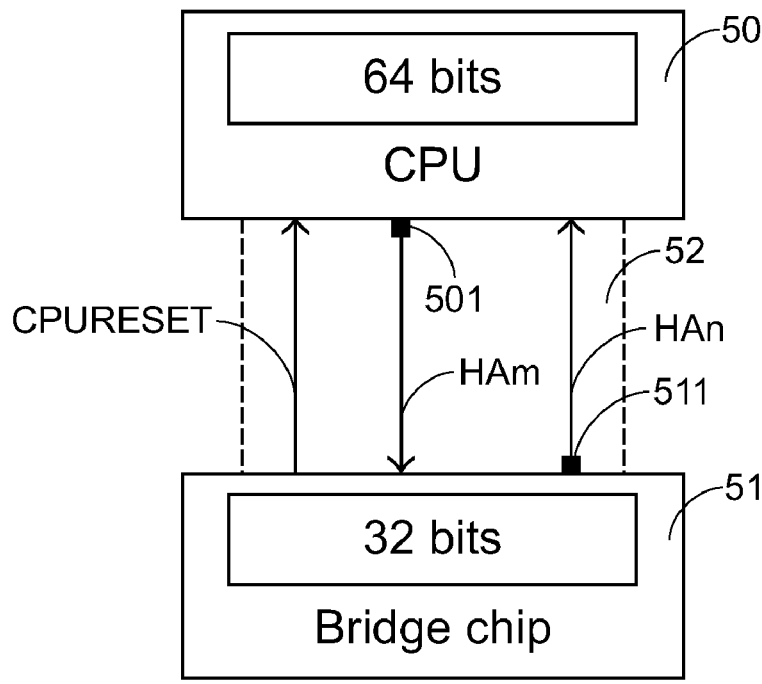
Figure 5D:
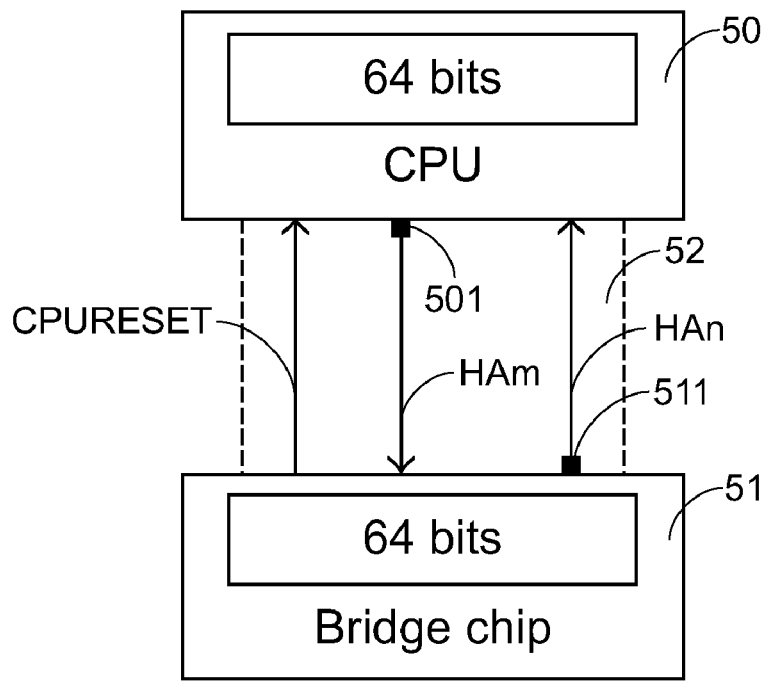

More specifically, the transmission standards are maximum bit numbers of bus transmission width or bus transmission speed. For example, when the data transmission coordinating method of FIG. 6 is applied to the combination of FIG. 2A, the coordinating signals HAm and HAn indicate 32-bit maximum bus transmission width and 32-bit maximum bus transmission width, respectively, as shown in FIG. 5A. The consistency of the maximum allows the successful data transmission between the CPU and the bridge chip. Likewise, as shown in FIG. 5D, the coordinating signals HAm and HAn indicate 64-bit maximum bus transmission width and 64-bit maximum bus transmission width, respectively, which are consistent for data transmission between the CPU and the bridge chip. On the other hand, in the combinations of FIG. 5B or 5C, the coordinating signals HAm and HAn indicate inconsistent 64-bit and 32-bit maximum bus transmission widths. As a greater bus transmission width can support a smaller bus transmission width, the smaller one of the maximum bus transmission widths, i.e. 32 bits, is suitably used as a commonly operable maximum bus transmission width for data transmission between the CPU and the bridge chip.

More specifically, the coordinating signals HAm and Han are encoded and outputted as a single bit or a serial or parallel bit combination of voltage level that differentiates the CPUs and the bridge chips, respectively. For example, when there are two choices of CPUs, e.g. 32-bit maximum bus transmission width and 64-bit maximum bus transmission width, a continuously high level and a lowered level are enough for reflecting the higher bit number and the lower bit number, which may be exchanged as well. On the other hand, bit combinations would be better for differentiating more than 2 choices of CPUs. For example, the bits "00" indicates a small bus transmission width, the bits "01" indicates a medium bus transmission width, and the bits "10" indicates a large bus transmission width.

Figure 4A:
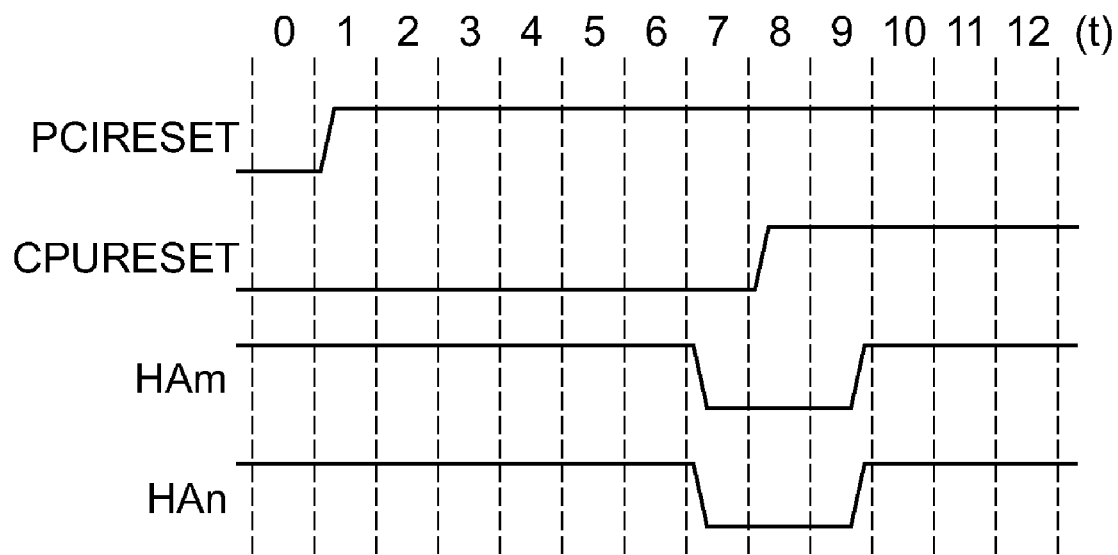
FIGS. 4A~4D are time sequence plots illustrating a data transmission coordinating method according to an embodiment of the present invention.
Figure 4B:
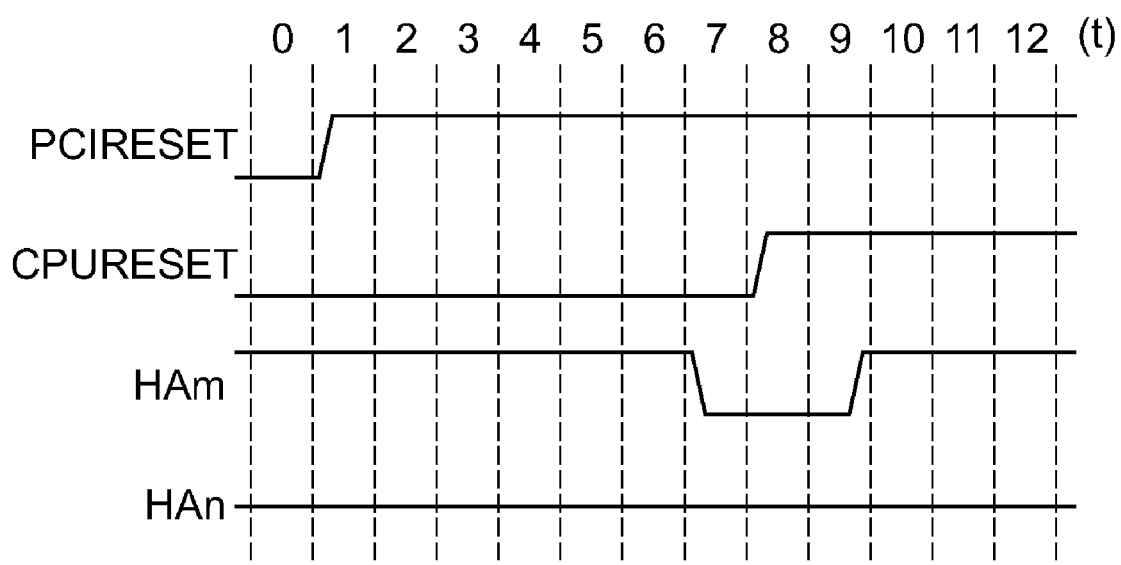
Figure 4C:
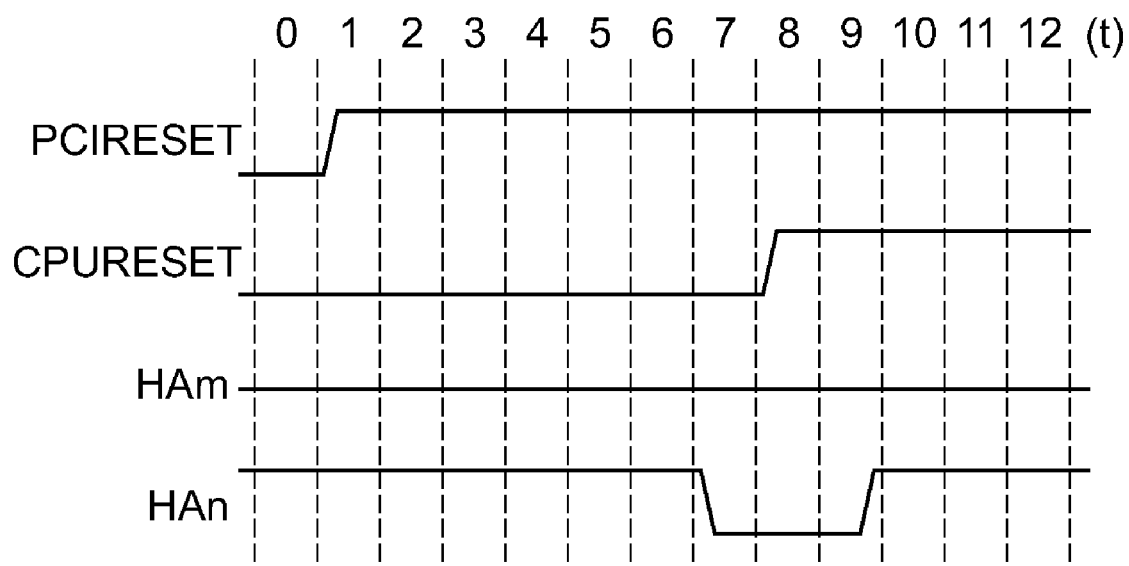
Figure 4D:
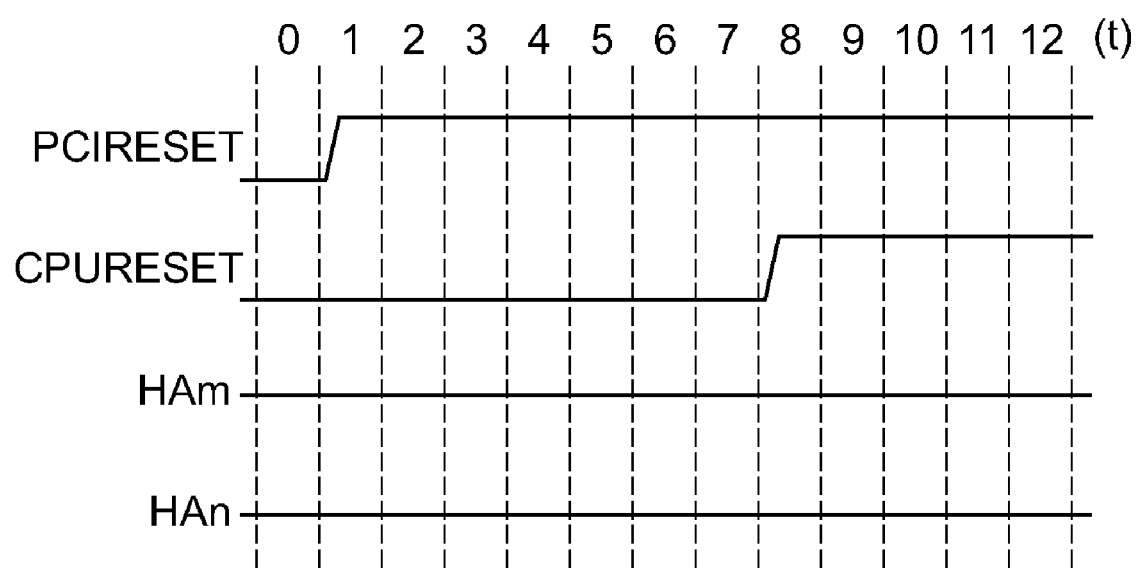
Figure 7:
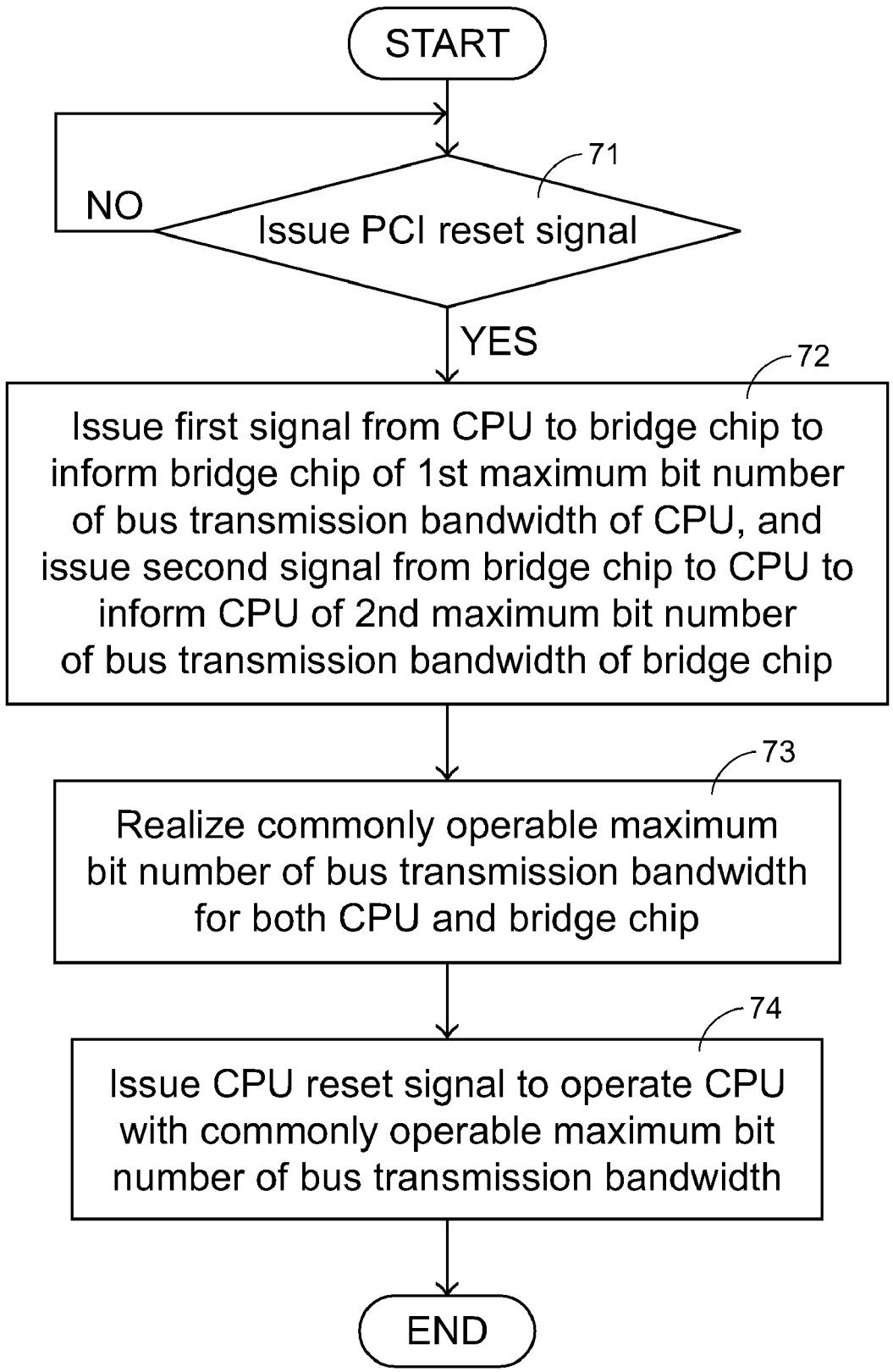
FIG. 7 is a flowchart illustrating a data transmission coordinating method according to another embodiment of the present invention.

Signal-issuing time sequences of the signals involved in the present method are exemplified in FIGS. 4A~4D. As shown in FIG. 4A, a PCI reset signal PCIRESET is first issued at t1. In response to the PCI reset signal PCIRESET, a coordinating signal HAm is outputted from the CPU to the bridge chip and another coordinating signal Han is outputted from the bridge chip to the CPU at t7. Since the coordinating signals HAm and HAn are both at the low level state, the CPU reset in response to the reset signal CPURESET issued by the bridge chip will follow, e.g. at t8, so that the CPU will operate with current transmission standard for subsequent data transmission. Likewise, in FIG. 4D, the coordinating signals HAm and HAn are both continuously high, so the reset CPU will operate with current transmission standard for subsequent data transmission. On the contrary, in FIG. 4B or 4C, one of the coordinating signals HAm and Han is continuously at the high level state and the other is at the low level state, which means the reset CPU will operate with a commonly operable transmission standard, for example the smaller maximum bit number of bus transmission width, for subsequent data transmission. The above examples are summarized in the flowchart of FIG. 7, Steps 71~74.

Figure 8:
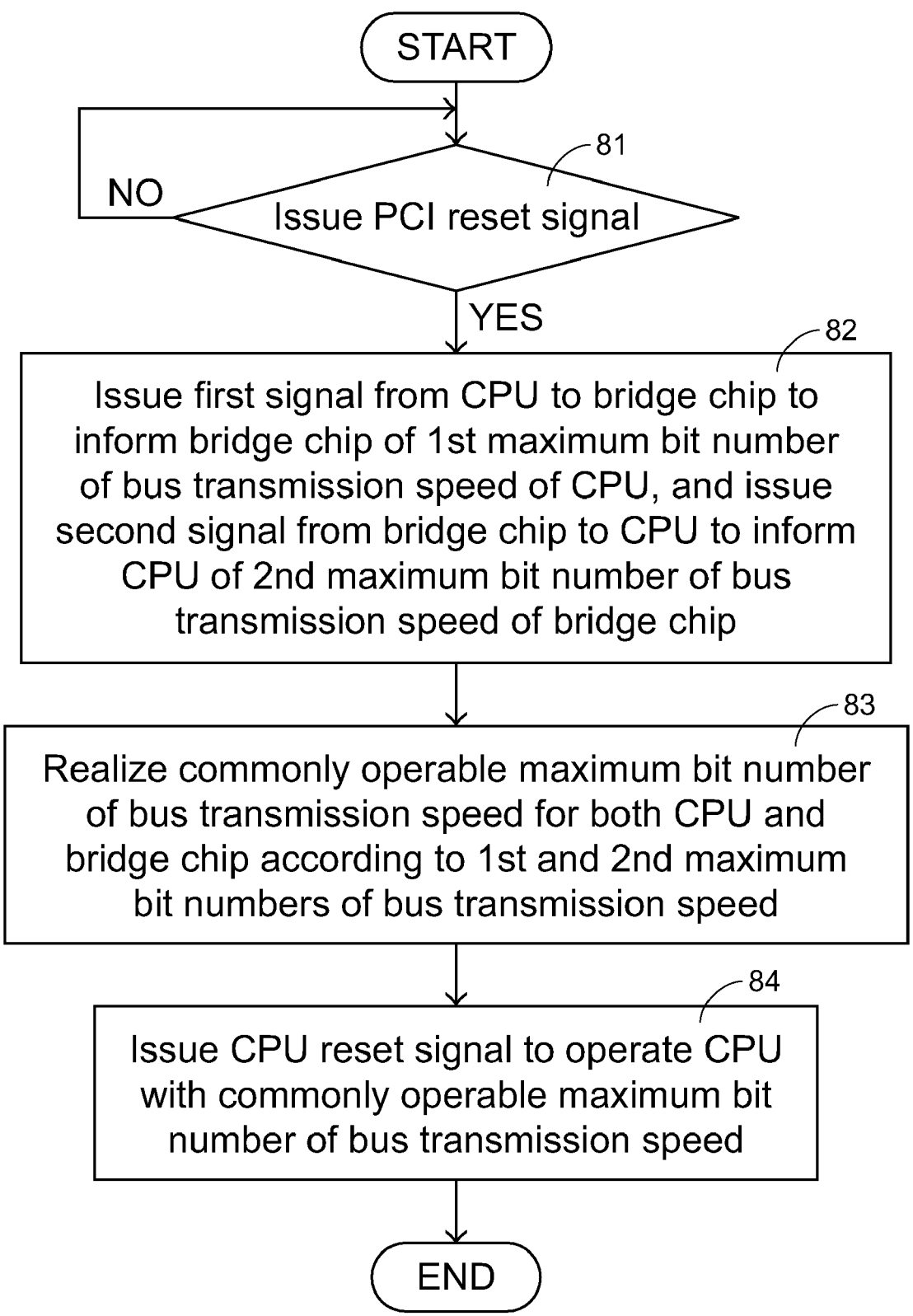
FIG. 8 is a flowchart illustrating a data transmission coordinating method according to a further embodiment of the present invention.

Although the above embodiments are exemplified to coordinate bus transmission width, the present invention may also be used to coordinate bus transmission speed, as described in the flowchart of FIG. 8, Steps 81~84.

Figure 1A:
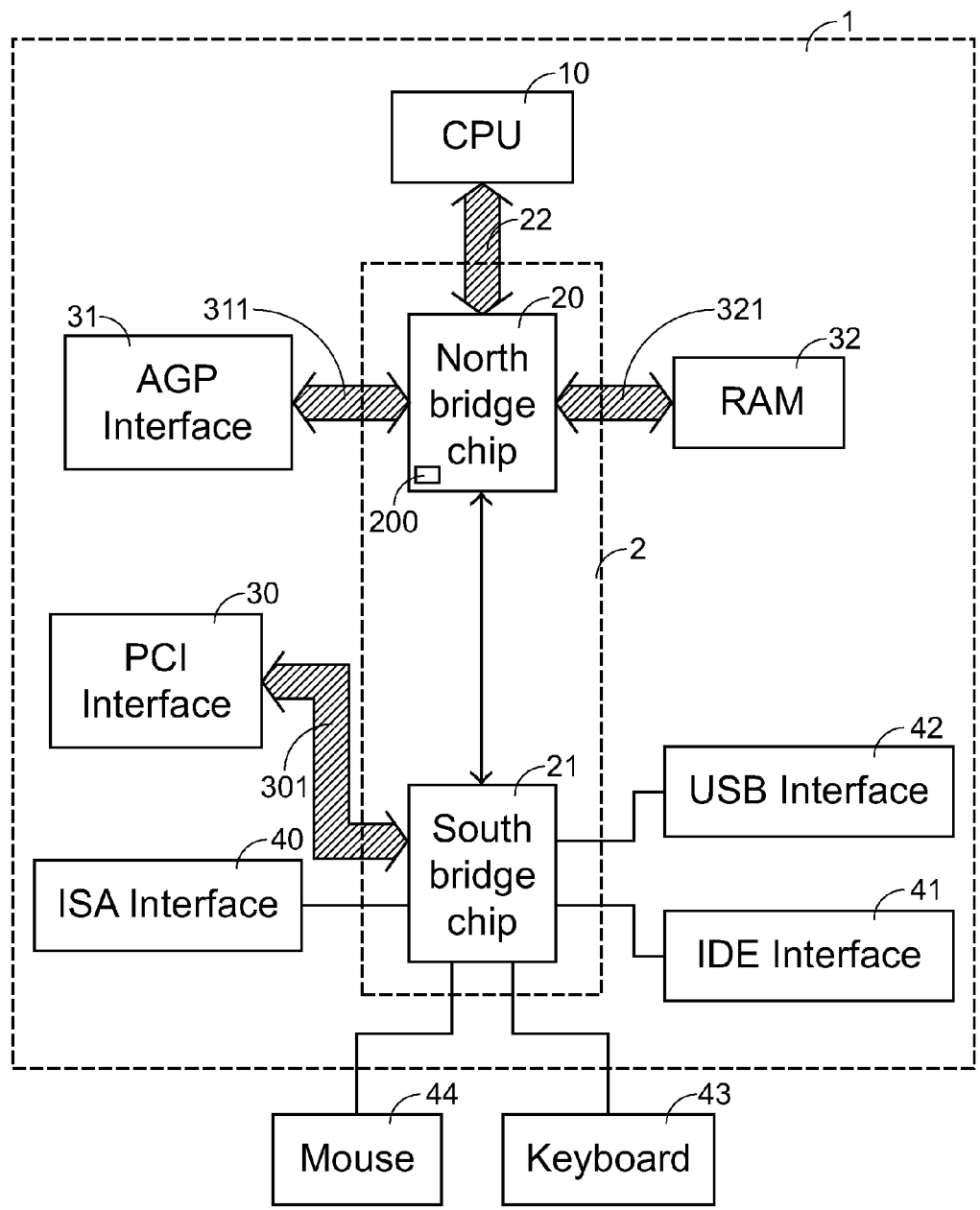
FIG. 1A is a schematic circuit block diagram of a computer system.
Figure 1B:
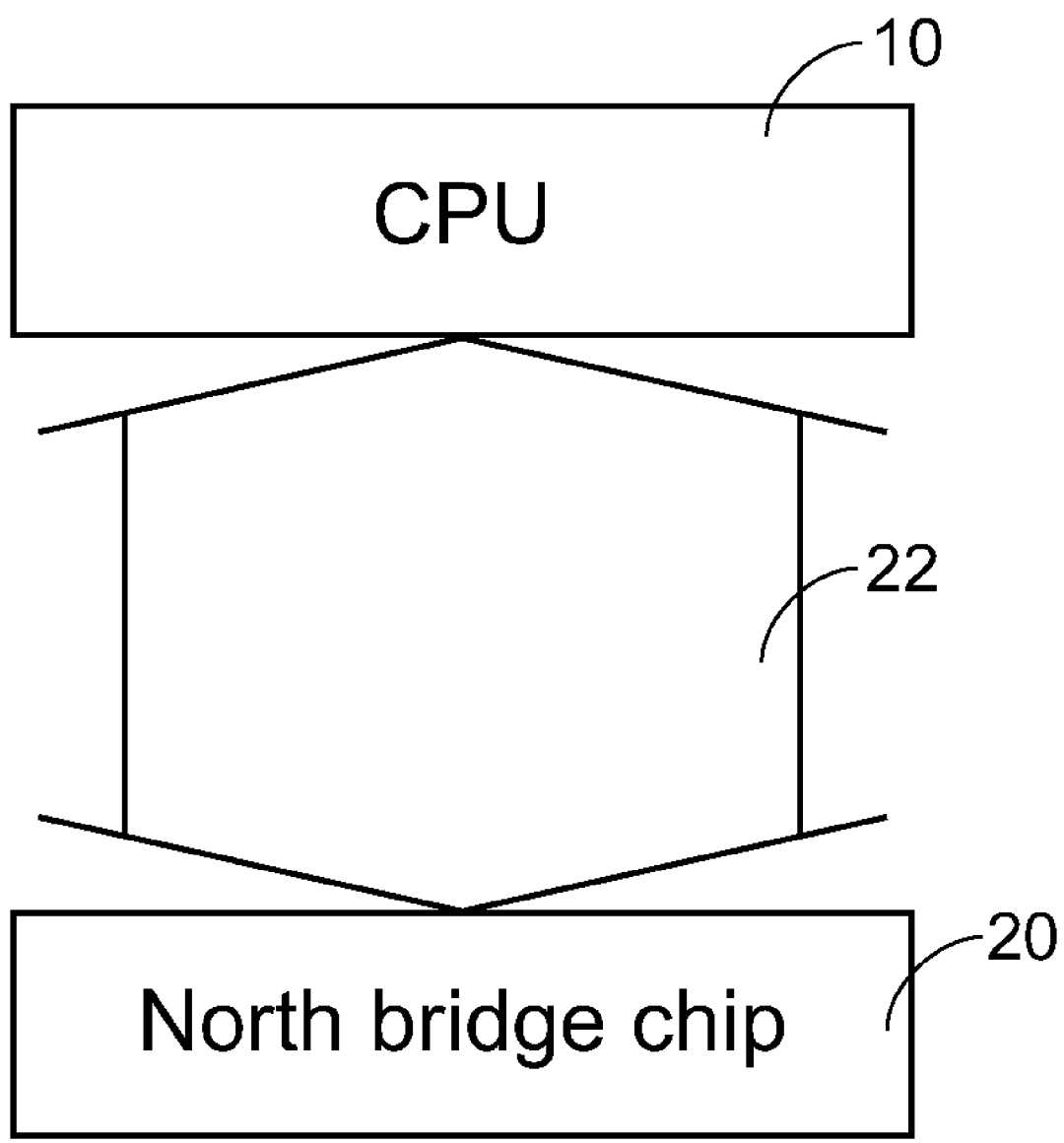
FIG. 1B is a schematic diagram illustrating the data transmission between the CPU and the north bridge chip via the front side bus.

In the above embodiments, the transmission standard of the bridge chip may be stored in a storage unit of the north bridge chip, e.g. the memory unit 200 disposed in the north bridge chip 20 shown in FIG. 1A, and readable when the bridge chip needs to inform the CPU of the transmission standard. Alternatively, the transmission standard of the bridge chip may be stored in another place instead of the north bridge chip as long as the information can be successfully transmitted to the CPU by the bridge chip.

Figure 9:
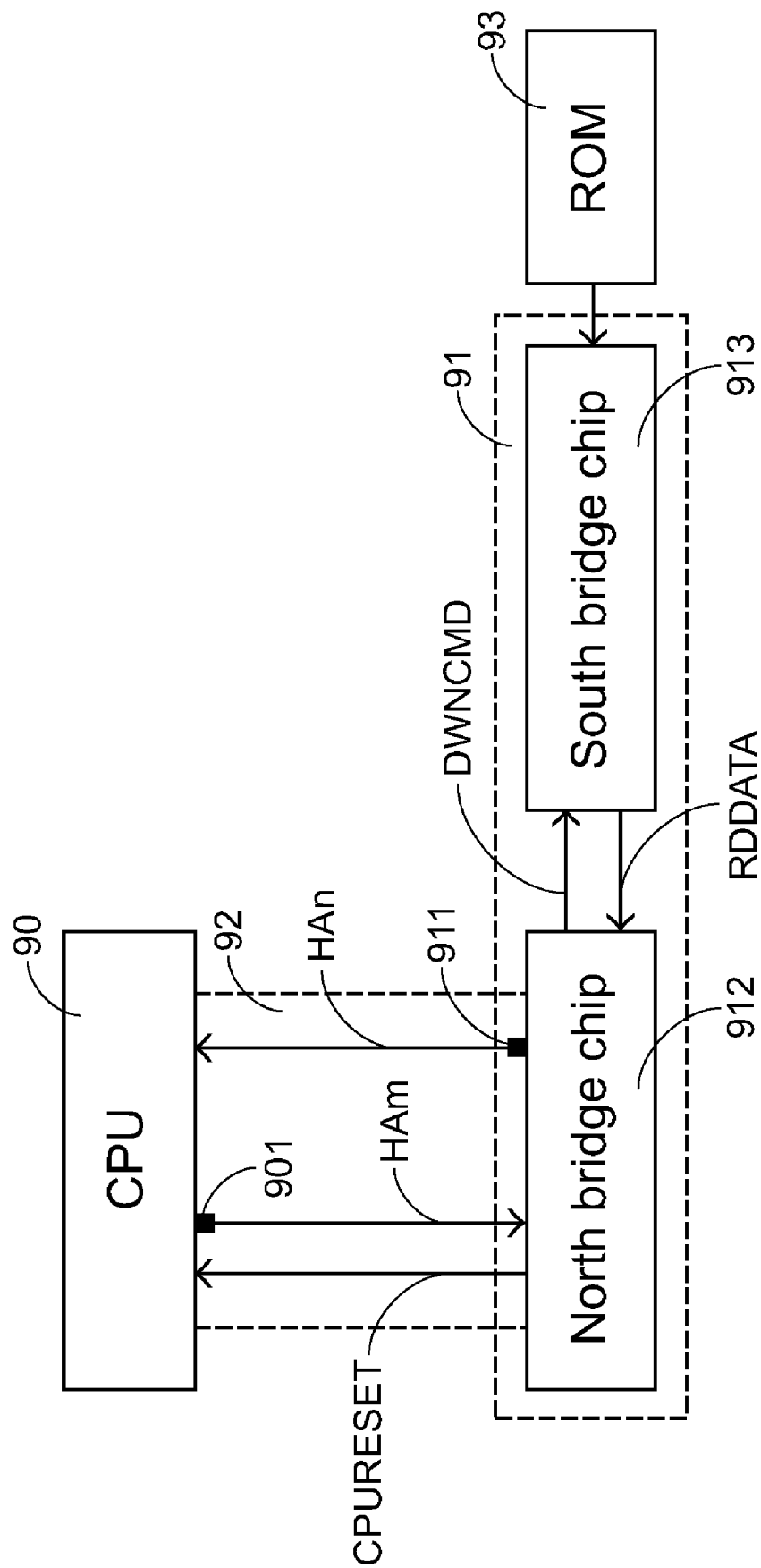
FIG. 9 is a schematic diagram illustrating a data transmission coordinating method according to an embodiment of the present invention, wherein the CPU and the north bridge chip issue respective coordinating signals via selected ones of pins disposed therebetween.

In a computer system of FIG. 9, a CPU 90 communicates with a chipset 91 that a north bridge chip 912 and a south bridge chip 913 are integrated. The north bridge chip 912 is electrically connected to the CPU 90 via a front side bus 92. The south bridge chip 913 is electrically connected to a read-only memory (ROM) 93, in which the front-side-bus transmission standard of the north bridge chip 912 is stored in the ROM 93. For coordinating a commonly operable front-side-bus transmission standard, the computer system enters a coordinating state, and both the CPU 90 and north bridge chip 912 informed each other of their operable front-side-bus transmission standards. As the operable front-side-bus transmission standard of the north bridge chip 912 is stored in the ROM 93, the north bridge chip 912 issues a reading signal DWNCMD to the ROM 93 via the south bridge chip 913 to read the operable transmission standard. Subsequently, via a data receiving signal RDDATA responding to the DWNCMD signal, the north bridge chip 512 realizes the operable front-side-bus transmission standard from the ROM 93. Accordingly, the CPU 90 issues a coordinating signal HAm from a pin 901 thereof, e.g. the mth bit, which is one of the pins in communication with the north bridge chip 912, and the north bridge chip 912 issues another coordinating signal HAn from a pin 911 of the chipset 91, e.g. the nth bit, which is one of the pins in communication with the CPU 90. Via the coordinating signal HAm, the north bridge chip 912 is informed of the operable front-side-bus transmission standard of the CPU 90. On the other hand, via the coordinating signal HAn, the CPU 90 is informed of the operable front-side-bus transmission standard of the chipset 91. Since the CPU 90 and the chipset 91 realize the transmission standard of each other, a commonly operable transmission standard can be coordinated.

Figure 10:
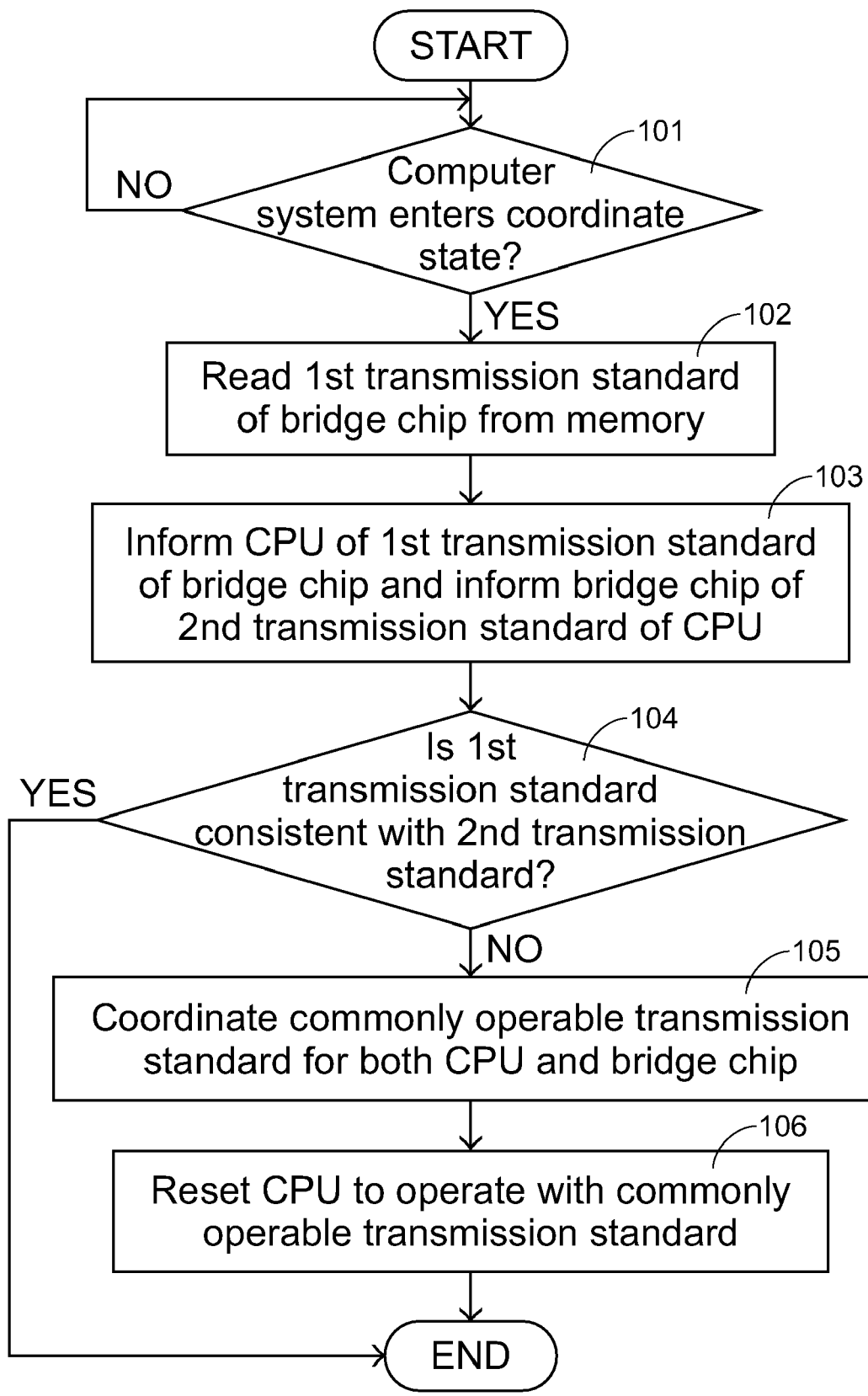
FIG. 10 is a flowchart illustrating a data transmission coordinating method according to an embodiment of the present invention.

A flowchart shown in FIG. 10 illustrates a data transmission coordinating method applicable to the system of FIG. 9. For starting the data transmission coordination, a PCI reset signal is issued (Step 101). Then, the information associated with a transmission standard of the north bridge chip is read from the memory (Step 102). Then, the coordinating signals HAm and HAn are issued by the CPU and the bridge chip to each other, respectively (Step 103). If the transmission standards indicated by the coordinating signals HAm and HAn are consistent with each other (Step 104), the subsequent data transmission between the CPU and bridge chip can be performed with current transmission standards. Otherwise, a commonly operable transmission standard for both the CPU and the bridge chip is coordinated (Step 105), and then the bridge chip issues a CPU reset signal to reset the CPU (Step 106). The CPU thus operates with the commonly operable transmission standard for subsequent data transmission.

More specifically, the transmission standards are maximum bit numbers of bus transmission width or bus transmission speed. The consistency of the maximum allows the successful data transmission between the CPU and the bridge chip. For example, in a case that the coordinating signals HAm and HAn indicate 32-bit maximum bus transmission width and 32-bit maximum bus transmission width, respectively, data transmission between the CPU and the bridge chip is consistent. Likewise, in another case that the coordinating signals HAm and HAn indicate 64-bit maximum bus transmission width and 64-bit maximum bus transmission width, respectively, the consistency of the maximum allows the successful data transmission. On the other hand, if the coordinating signals HAm and HAn indicate inconsistent 64-bit and 32-bit maximum bus transmission widths, a commonly operable maximum bus transmission width is necessary. As a greater bus transmission width can support a smaller bus transmission width, the smaller one of the maximum bus transmission widths, i.e. 32 bits, is suitably used as the commonly operable maximum bus transmission width for data transmission between the CPU and the bridge chip.

More specifically, the coordinating signals HAm and HAn are encoded and outputted as a single bit or a serial or parallel bit combination of voltage level that differentiates the CPUs and the bridge chips, respectively. For example, when there are two choices of CPUs, e.g. 32-bit maximum bus transmission width and 64-bit maximum bus transmission width, a continuously high level and a lowered level are enough for reflecting the higher bit number and the lower bit number, which may be exchanged as well. On the other hand, bit combinations would be better for differentiating more than 2 choices of CPUs. For example, the bits "00" indicate a small bus transmission width, the bits "01" indicate a medium bus transmission width, and the bits "10" indicate a large bus transmission width.

Figure 11A:
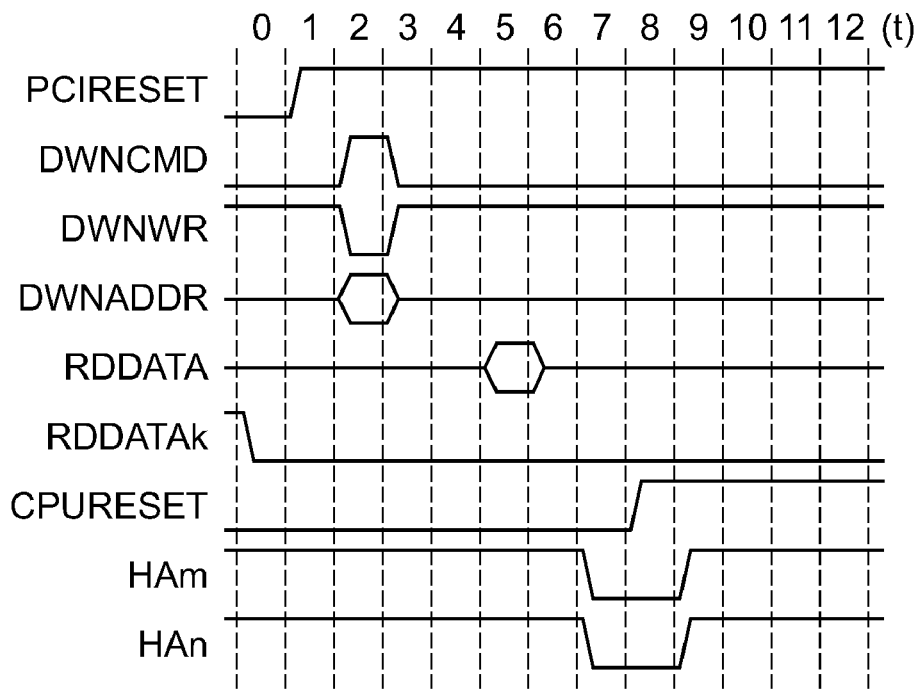
FIGS. 11A~11D are time sequence plots illustrating a data transmission coordinating method according to an embodiment of the present invention.
Figure 11B:
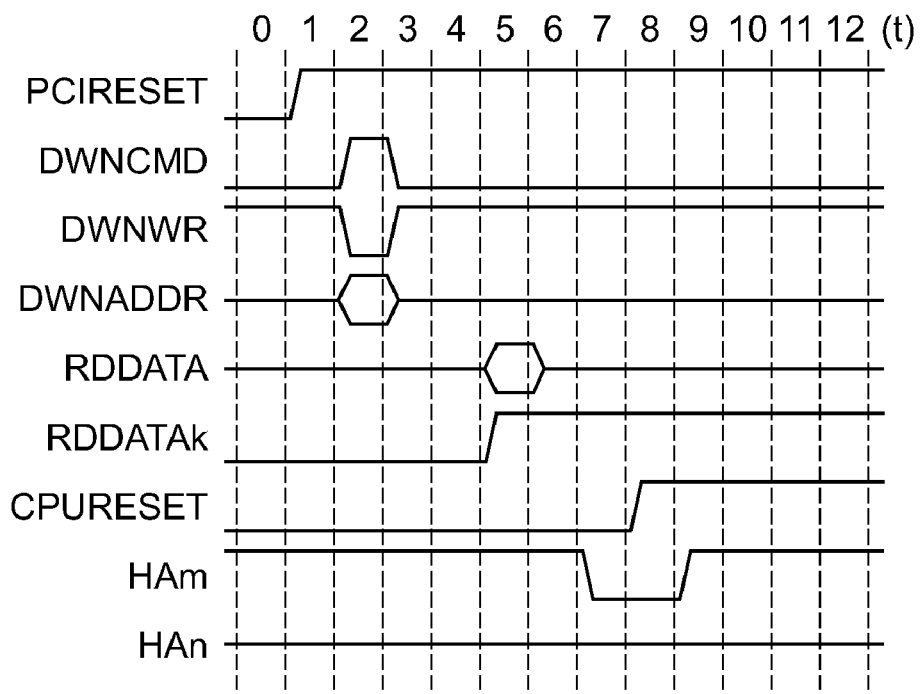
Figure 11C:
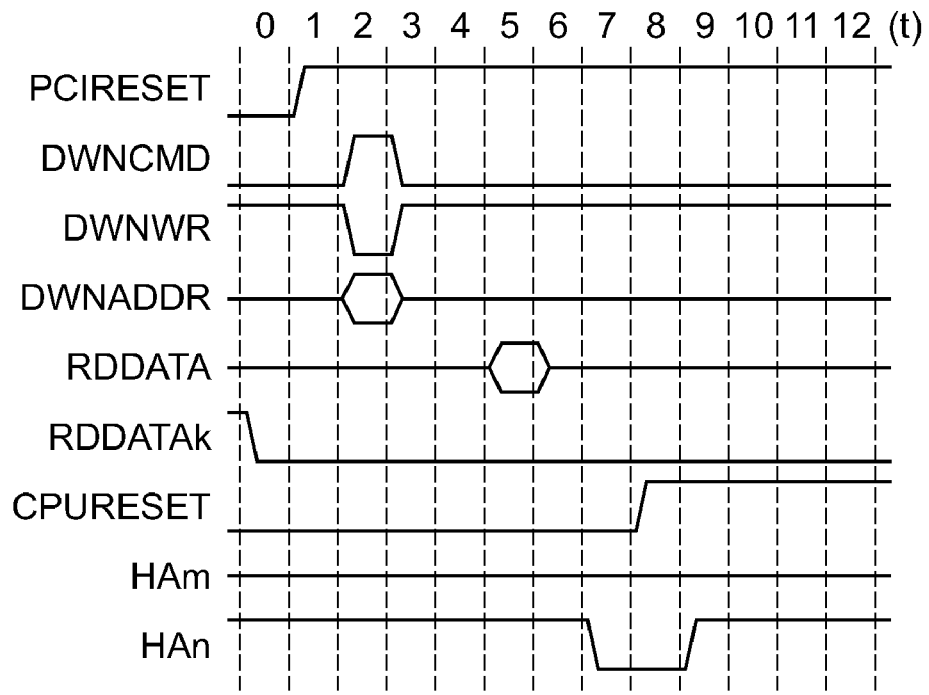
Figure 11D:
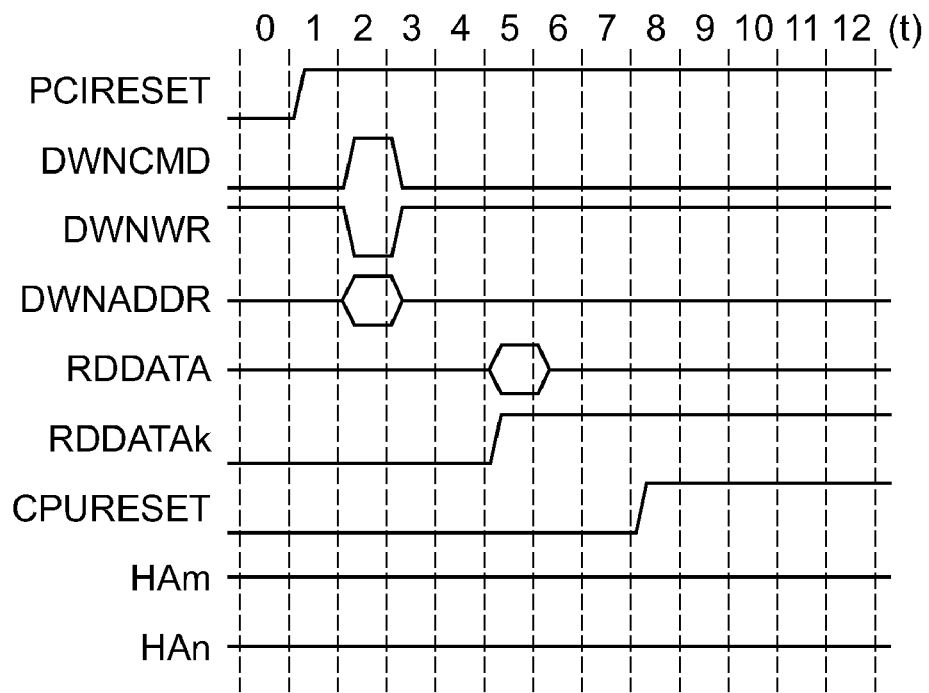
Figure 12:
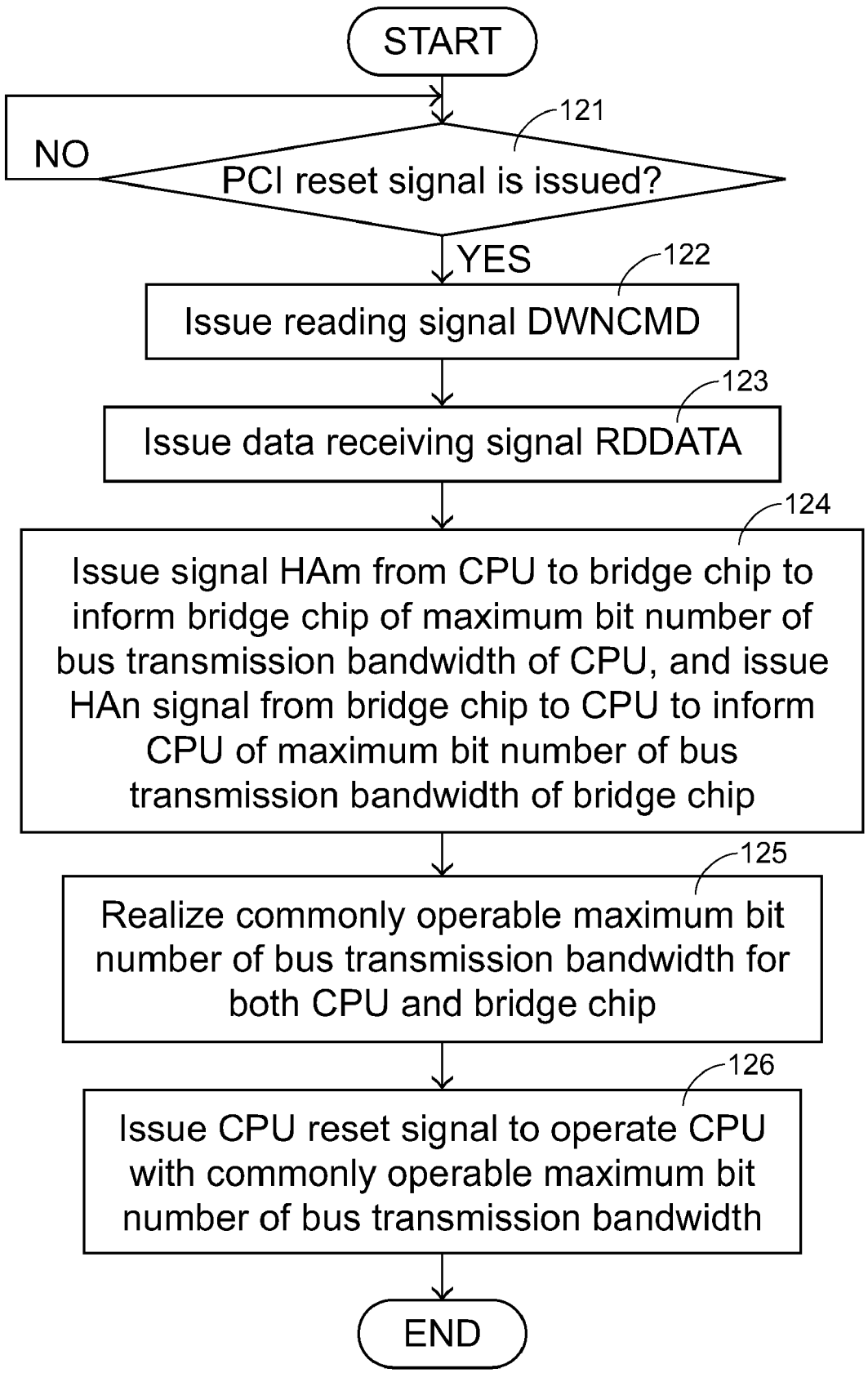
FIG. 12 is a flowchart exemplifying a data transmission coordinating method according to the embodiment of FIG. 11.

Signal-issuing time sequences of the signals involved in the present method are exemplified in FIGS. 11A~11D. As shown in FIG. 11A, a PCI reset signal PCIRESET is first issued at t1. In response to the PCI reset signal PCIRESET, the north bridge chip 512 issues a reading signal DWNCMD, which includes two parts DWNWR and DWNADDR, to the read-only memory 53 via the south bridge chip 513 at t2. At t5, the south bridge chip 513 issues a data receiving signal RDDATA to provide the required operable transmission standard for the north bridge chip 512. The information associated with the operable transmission standard of the north bridge chip 512 is carried by a bit or a bit combination of the data receiving signal RDDATA, e.g. the kth bit, and denoted as RDDATAk. A high level state and a low level state of the signal RDDATAk reflect the larger bus transmission width and the smaller bus transmission width, respectively. In response to the data receiving signal RDDATA, a coordinating signal HAm is outputted from the CPU to the bridge chip and another coordinating signal HAn is outputted from the bridge chip to the CPU at t7. Afterwards, the CPU reset in response to the reset signal CPURESET issued by the north bridge chip will follow, e.g. at t8. As the coordinating signals HAm and HAn are both in a low level state, it means the transmission standards of the CPU and the north bridge chip is consistent with each other, so both the CPU and the north bridge chip will operate with current transmission standards for subsequent data transmission. Likewise, in FIG. 11D, the coordinating signals HAm and HAn are both continuously high, so the reset CPU will operate with current transmission standard for subsequent data transmission with the north bridge chip. On the contrary, in FIG. 11B or 11C, one of the coordinating signals HAm and Han is continuously high and the other is in a low level state, so the reset CPU will operate with a commonly operable transmission standard, for example the smaller maximum bit number of bus transmission width, for subsequent data transmission. The above examples are summarized in the flowchart of FIG. 12, Steps 121~126.

Figure 13:
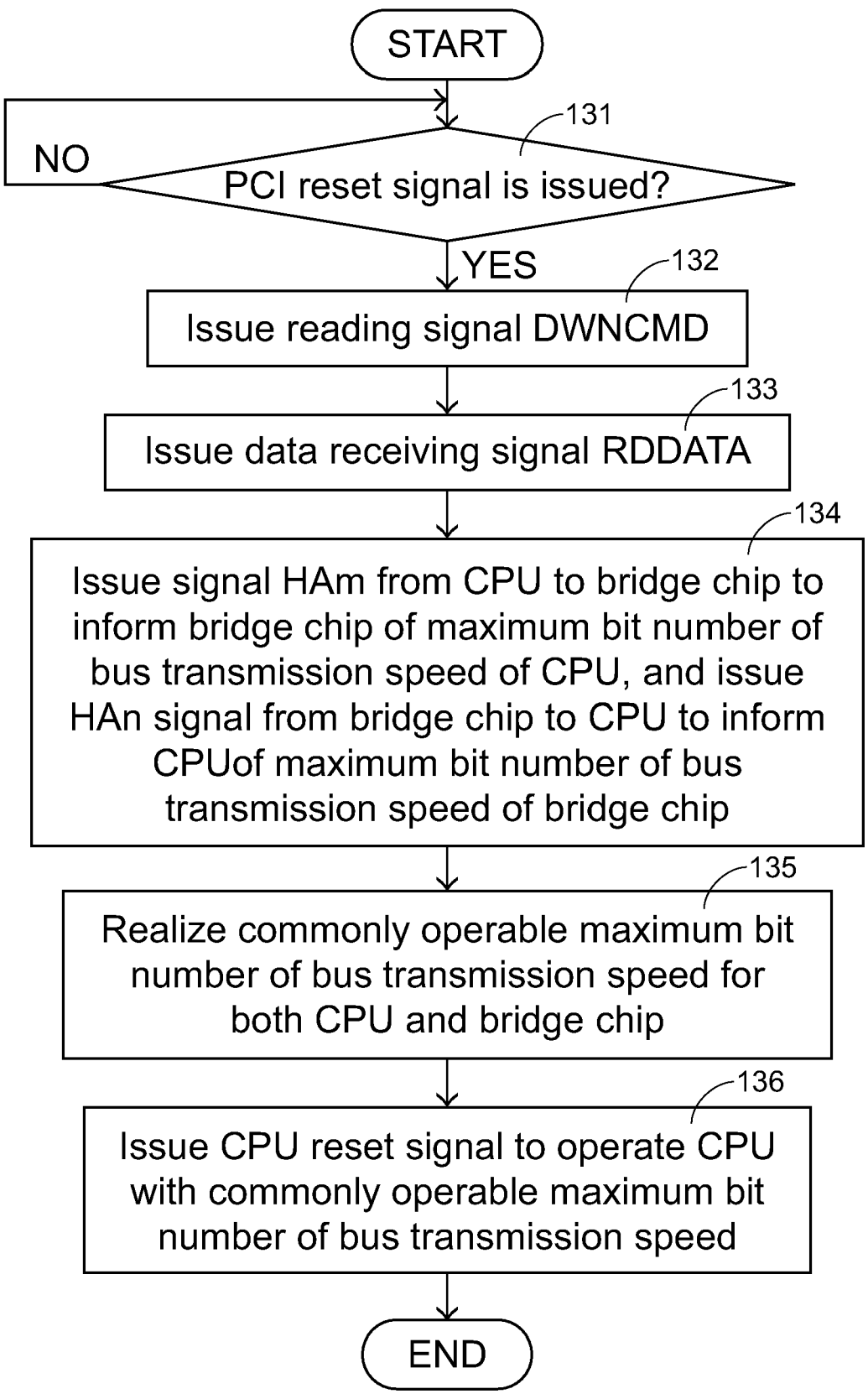
FIG. 13 is a flowchart exemplifying a data transmission coordinating method according to the embodiment of FIG. 11.

Although the above embodiments are exemplified to coordinate bus transmission width, the present invention may also be used to coordinate bus transmission speed, as described in the flowchart of FIG. 13, Steps 131~136.

From the above embodiments, it is understood that by coordinating a commonly operable transmission standard for both the CPU and the bridge chip in advance and resetting the CPU to operate with the commonly operable transmission standard, the possible incompatibility problem between the CPU and the bridge chip can be solved so that the usage of the CPU and bridge chip becomes more flexible than ever.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data transmission coordinating method for a central processing unit and a north bridge chip of a computer system, the north bridge chip being coupled to a south bridge chip, the method comprising steps of:

issuing a read signal by the north bridge chip for reading a first transmission standard of the north bridge chip stored in a memory unit;

issuing a data receiving signal by the south bridge chip in response to the reading signal to transmit the first transmission standard from the memory unit to the north bridge chip;

issuing a first signal from the north bridge chip to the central processing unit to inform the central processing unit of the first transmission standard of the north bridge chip;

issuing a second signal from the central processing unit to the north bridge chip to inform the north bridge chip of a second transmission standard of the central processing unit; and coordinating a commonly operable transmission standard for both the central processing unit and the north bridge chip according to the first transmission standard and the second transmission standard.

2. The method according to claim 1 wherein the information associated with the first transmission standard of the north bridge chip is read after the computer system enters a coordinating state.

3. The method according to claim 2 wherein the computer system enters the coordinating state in response to a peripheral component interconnect (PCI) reset signal.

4. The method according to claim 1 further comprising a step of resetting the central processing unit to operate with the commonly operable transmission standard in response to a resetting signal.

5. The method according to claim 1 wherein the commonly operable transmission standard to be coordinated is a maximum bit number of bus transmission width.

6. The method according to claim 5 wherein the commonly operable transmission standard is the smaller one of a first maximum bit number of bus transmission width of the north bridge chip and a second maximum bit number of bus transmission width of the central processing unit.

7. The method according to claim 1 wherein the commonly operable data transmission standard to be coordinated is a maximum bus transmission speed.

8. The method according to claim 7 wherein the commonly operable transmission standard is the smaller one of a maximum bus transmission speed of the central processing unit and a maximum bus transmission speed of the north bridge chip.

9. The method according to claim 1 wherein the first signal is outputted by the north bridge chip via a first pin communicating the north bridge chip with the central processing unit.

10. The method according to claim 9 wherein the second signal is outputted by the central processing unit via a second pin communicating the central processing unit with the north bridge chip.

11. The method according to claim 10 wherein the same level states of the first signal and the second signal indicate the same transmission standards, and different level states of the first signal and the second signal indicate different transmission standards.

12. The method according to claim 10 wherein the same bit combinations of the first and second signals indicate the same transmission standards, and different bit combinations of the first and second signals indicate different transmission standards.

13. The method according to claim 1 wherein the memory unit is a read-only memory.

14. A data transmission coordinating method for use between a central processing unit and a north bridge chip of a computer system, the north bridge chip being coupled to a south bridge chip, the method comprising steps of:

entering a coordinating state of the computer system;

issuing a read signal by the north bridge chip for reading an information stored in a memory unit, wherein the information includes a first maximum bit number of the north bridge chip and is referred to for data transmission with the central processing unit via a bus;

issuing a data receiving signal by the south bridge chip in response to the reading signal to transmit the information from the memory unit to the north bridge chip;

informing the central processing unit of the first maximum bit number of the north bridge chip;

informing the north bridge chip of a second maximum bit number of the central processing unit for data transmission with the north bridge chip via the bus;

coordinating a commonly operable maximum bit number for data transmission between the central processing unit and the north bridge chip via the bus according to the first and second maximum bit numbers; and resetting the central processing unit to operate with the commonly operable maximum bit number.

15. The method according to claim 14 wherein the first maximum bit number, second maximum bit number and commonly operable bit number for data transmission are bit numbers of bus transmission width or bit numbers of bus transmission speed per unit of time.

16. A data transmission coordinating system, comprising:
a memory unit storing therein a first transmission standard,
a south bridge chip coupled to the memory unit;
a north bridge chip operable under the first transmission standard and accessible to the memory unit via the south bridge chip;
a central processing unit operable under a second transmission standard; and
a bus communicating the north bridge chip with the central processing unit under an operable transmission standard common to the north bridge chip and the central processing unit,
wherein the north bridge chip issues a reading signal for reading the first transmission standard stored in the memory unit after entering the coordinating state; the south bridge chip issues a data receiving signal in response to the reading signal and transmits the first transmission standard from the memory unit to the north bridge chip; and the north bridge chip, after realizing the first transmission standard, issues a first signal to inform the central processing unit of the first transmission standard thereof, and the central processing unit issues a second signal to inform the north bridge chip of the second transmission standard thereof after a coordinating state is entered, thereby coordinating the operable transmission standard for data transmission between the north bridge chip and the central processing unit via the bus according to the first transmission standard and second transmission standard.

* * * * *